(12) United States Patent
Yamada et al.

(10) Patent No.: US 12,221,064 B2
(45) Date of Patent: Feb. 11, 2025

(54) SMART KEY SYSTEM FOR AUTOMOBILE

(71) Applicant: TOYOTA JIDOSHA KABUSHIKI KAISHA, Toyota (JP)

(72) Inventors: Koushi Yamada, Odawara (JP);
Junichi Sudo, Fujisawa (JP);
Kenichiro Sakurai, Nagakute (JP);
Toshio Tanahashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/050,218

(22) Filed: Oct. 27, 2022

(65) Prior Publication Data

US 2023/0174015 A1  Jun. 8, 2023

(30) Foreign Application Priority Data

Dec. 3, 2021 (JP) ................. 2021-197305

(51) Int. Cl.
*B60R 25/24* (2013.01)
*B60R 25/20* (2013.01)
*G07C 9/00* (2020.01)

(52) U.S. Cl.
CPC .......... *B60R 25/24* (2013.01); *B60R 25/2072* (2013.01); *G07C 9/00309* (2013.01)

(58) Field of Classification Search
None
See application file for complete search history.

(56) References Cited

U.S. PATENT DOCUMENTS

| | | | |
|---|---|---|---|
| 5,351,051 A * | 9/1994 | Yano | H01H 9/0214 340/12.55 |
| 6,123,521 A * | 9/2000 | Mori | F02M 37/10 417/423.9 |
| 6,812,823 B2 * | 11/2004 | Inaba | G07C 9/00309 340/5.6 |
| 9,258,934 B2 * | 2/2016 | Saito | H05K 9/0037 |
| 9,349,503 B1 * | 5/2016 | Teng | H01B 7/18 |
| 9,681,542 B2 * | 6/2017 | Ziegler | H05K 1/117 |
| 9,848,504 B2 * | 12/2017 | Sasaki | H05K 5/03 |
| 9,948,092 B2 * | 4/2018 | Tsaur | H02H 9/046 |

(Continued)

FOREIGN PATENT DOCUMENTS

| | | | |
|---|---|---|---|
| JP | 20150033666 A * | 4/2015 | |
| JP | 2017-57627 A | 3/2017 | |
| JP | 2017-183988 A | 10/2017 | |

*Primary Examiner* — Carlos Garcia
(74) *Attorney, Agent, or Firm* — Oblon, McClelland, Maier & Neustadt, L.L.P.

(57) ABSTRACT

A key system for an automobile according to the present disclosure includes an on-vehicle device configured to transmit and receive a radio signal to and from an electronic key, and a resin panel through which the on-vehicle device is fixed to and held by a body of the automobile. The on-vehicle device includes a transmitter configured to transmit a search signal to the electronic key, a receiver configured to receive a response signal transmitted from the electronic key in response to the search signal, a control unit configured to control the transmission of the search signal, and a resin case. The smart key system for the automobile according to the present disclosure removes electrostatic charging generated by the search signal transmitted from the transmitter in either or both of the resin case and the resin panel.

9 Claims, 5 Drawing Sheets

(56) References Cited

U.S. PATENT DOCUMENTS

| | | | |
|---|---|---|---|
| 10,259,408 B2* | 4/2019 | Tanahashi | B60R 16/06 |
| 10,384,663 B2* | 8/2019 | Yamada | B60T 11/16 |
| 10,938,163 B2* | 3/2021 | Azad | H01R 13/6599 |
| 10,978,833 B2* | 4/2021 | Azad | H01R 13/748 |
| 11,322,276 B2* | 5/2022 | Sugihara | H01B 7/421 |
| 11,989,987 B2* | 5/2024 | Bos | G07C 9/00309 |
| 2003/0072944 A1* | 4/2003 | Hiraiwa | B60K 35/00 428/411.1 |
| 2004/0217906 A1* | 11/2004 | Ishibayashi | H01Q 1/1271 343/711 |
| 2015/0109747 A1* | 4/2015 | Saito | B60R 16/02 361/753 |
| 2016/0146849 A1* | 5/2016 | Yaguchi | G01P 15/0802 73/514.35 |
| 2017/0076524 A1 | 3/2017 | Yoshihara | |
| 2017/0222178 A1* | 8/2017 | Kang | H10K 59/00 |
| 2018/0001851 A1* | 1/2018 | Tanahashi | B60L 15/007 |
| 2022/0059283 A1* | 2/2022 | Nakamura | H01F 27/32 |
| 2022/0176898 A1* | 6/2022 | Sone | B60R 16/0207 |
| 2022/0302582 A1* | 9/2022 | Liu | H01Q 21/28 |

\* cited by examiner

SMART KEY SYSTEM FOR AUTOMOBILE

CROSS REFERENCE TO RELATED APPLICATIONS

This application is based upon and claims the benefit of priority from Japanese patent application No. 2021-197305, filed on Dec. 3, 2021, the disclosure of which is incorporated herein in its entirety by reference.

BACKGROUND

The present disclosure relates to a smart key system for an automobile.

Japanese Unexamined Patent Application Publication No. 2017-057627 (hereinafter also referred to as Patent Literature 1) discloses a smart key system for an automobile. The smart key system disclosed in Patent Literature 1 includes an on-vehicle device and a portable device capable of wirelessly communicating with the on-vehicle device. In the on-vehicle device disclosed in Patent Literature 1, the larger the strength of the noise signals contained in a radio signal received from the portable device is, the more the strength of the radio signal transmitted to the portable device is increased.

SUMMARY

In the smart key system disclosed in Patent Literature 1, there is a case where as the radio signal transmitted from the on-vehicle device is increased, a resin case of the on-vehicle device and a resin panel through which the on-vehicle device is fixed to and held by the body of the vehicle are electrostatically charged. When the resin case of the on-vehicle device and the resin panel through which the on-vehicle device is fixed to and held by the body of the vehicle are electrostatically charged, the strength of the noise signals contained in the radio signal received from the portable device is increased, so that the strength of the radio signal transmitted from the on-vehicle device is further increased and hence the resin case and the resin panel are electrostatically charged even further.

When the amount of electrostatic charging in the resin case and the resin panel increases, the vehicle may not exhibit its normal traveling performance due to the increased amount of electrostatic charging.

The present disclosure has been made in order to solve the above-described problem, and an object thereof is to provide a smart key system for an automobile capable of preventing or reducing the deterioration of the performance of the vehicle (i.e., the automobile) which would otherwise be caused by electrostatic charging of a resin case of an on-vehicle device and a resin panel through which the on-vehicle device is fixed to and held by the body of the automobile.

A first exemplary aspect is a smart key system for an automobile, including: an on-vehicle device configured to transmit and receive a radio signal to and from an electronic key; and a resin panel through which the on-vehicle device is fixed to and held by a body of the automobile, in which the on-vehicle device includes:
a transmitter configured to transmit a search signal to the electronic key;
a receiver configured to receive a response signal transmitted from the electronic key in response to the search signal;
a control unit configured to control at least the transmission of the search signal; and
a resin case configured to house therein the transmitter, the receiver, and the control unit, and
electrostatic charging generated by the search signal transmitted from the transmitter is removed from either or both of the resin case and the resin panel.

By the above-described configuration, it is possible to prevent or reduce the deterioration of the performance of the vehicle (i.e., the automobile) which would otherwise be caused by electrostatic charging of a resin case of an on-vehicle device and electrostatic charging of a resin panel through which the on-vehicle device is fixed to and held by the body of the vehicle.

In an aspect, in the smart key system for an automobile, the control unit may increase a strength of the search signal when a strength of the response signal received by the receiver is equal to or smaller than a predetermined strength, when a strength of a noise signal contained in the response signal is equal to or larger than the predetermined strength, or when the strength of the response signal is equal to or smaller than a predetermined strength and the strength of the noise signal is equal to larger than the predetermined strength.

In the case where the control unit controls the search signal as described above, the resin case and the resin panel are electrostatically charged more easily, so that the present disclosure is particularly effective.

In an aspect, in the smart key system for an automobile, at least one of the resin case and the resin panel, and the body of the automobile electrically connected to a negative electrode of an auxiliary battery may be connected to a ground, so that electrostatic charging may be removed from them.

By the above-described configuration, electrostatic charging can be efficiently removed from the resin case, the resin panel, or both of them.

In an aspect, in the smart key system for an automobile, at least one of the resin case and the resin panel, and the body of the automobile including an electrostatic-charging removing device may be connected to a ground, so that electrostatic charging may be removed from them.

Even by the above-described configuration, electrostatic charging can be efficiently removed from the resin case, the resin panel, or both of them.

In an aspect, in the smart key system for an automobile, at least one of the resin case and the resin panel may include a surfactant layer for the removal of the electrostatic charging on an exterior surface thereof.

Even by the above-described configuration, electrostatic charging can be efficiently removed from the resin case, the resin panel, or both of them.

In an aspect, in the smart key system for an automobile, at least one of the resin case and the resin panel may include an elastic film containing a surfactant for the removal of the electrostatic charging on an exterior surface thereof.

Even by the above-described configuration, electrostatic charging can be efficiently removed from the resin case, the resin panel, or both of them.

In an aspect, in the smart key system for an automobile, at least one of the resin case and the resin panel may include an elastic mesh sheet containing a surfactant for the removal of the electrostatic charging on an exterior surface thereof.

Even by the above-described configuration, electrostatic charging can be efficiently removed from the resin case, the resin panel, or both of them.

According to the present disclosure, it is possible to provide a smart key system for an automobile capable of preventing or reducing the deterioration of the performance of the vehicle (i.e., the automobile) which would otherwise be caused by electrostatic charging of a resin case of an on-vehicle device and electrostatic charging of a resin panel through which the on-vehicle device is fixed to and held by the body of the vehicle.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Background of Creation of the Invention

Figure 1:
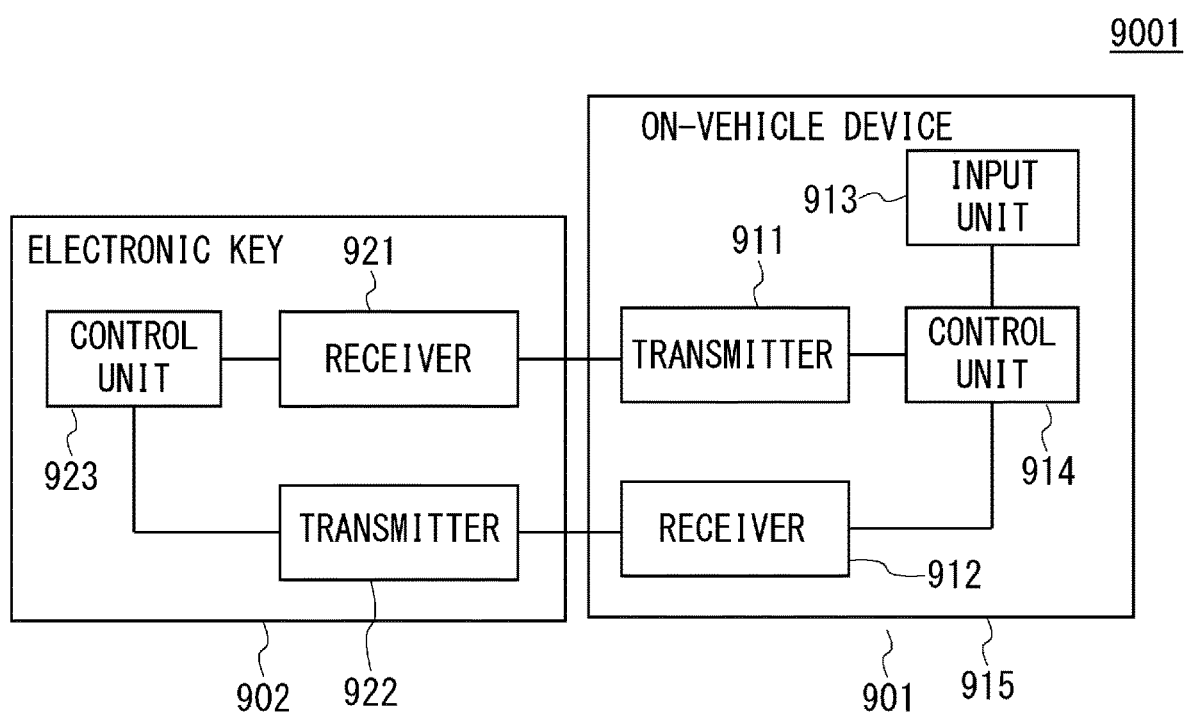
FIG. 1 is a block diagram showing a configuration of a smart key system according to related art.

FIG. 1 is a block diagram showing a configuration of a key system for an automobile according to related art.

A key system 9001 for an automobile according to the related art enables a user carrying an electronic key to carry out predetermined operations and thereby to use various functions provided in the automobile.

Examples of combinations of predetermined operations and functions provided in automobiles include unlocking of a door of an automobile by depressing a button provided on the door, and starting-up of an engine by depressing an engine start button.

The key system 9001 for the automobile according to the related art includes an on-vehicle device 901 and an electronic key 902.

The on-vehicle device 901 includes a transmitter 911, a receiver 912, an input unit 913, a control unit 914, and a resin case 915.

The transmitter 911 transmits a search signal, which is a radio signal, to the electronic key 902 under the control of the control unit 914. The receiver 912 receives a response signal transmitted from the electronic key 902 in response to the search signal.

Upon receiving the response signal, the receiver 912 outputs authentication information contained in the response signal to the control unit 914.

The input unit 913 is, for example, a door unlock button or an engine start button, and is a device on which a user performs a predetermined operation. When the predetermined operation is performed on the input unit 913 by the user, the input unit 913 notifies the control unit 914 that the predetermined operation has been performed thereon.

When the control unit 914 is notified, by the input unit 913, that the user has performed the predetermined operation, the control unit 914 controls the transmitter 911, and thereby makes (e.g., instructs) the transmitter 911 transmit a search signal.

Further, when the control unit 914 acquires, from the input unit 913, the authentication information contained in the response signal transmitted from the electronic key 902, the control unit 914 determines whether or not the acquired authentication information is the same as authentication information that is registered in advance. When the authentication information is the same as the one registered in advance, the control unit 914 notifies the control apparatus, which controls a predetermined function, that a function corresponding to the predetermined operation performed by the user should be carried out.

Note that when the strength of the response signal received from the electronic key 902 is equal to or smaller than a predetermined strength, when the strength of a noise signal contained in the response signal is equal to or larger than a predetermined strength, or when the strength of the response signal is equal to or smaller than the predetermined strength and the strength of the noise signal is equal to larger than the predetermined strength, the control unit 914 does not perform the determination and instead controls the transmitter 911 so that the transmitter 911 transmits a search signal having a strength higher than that of the previous search signal.

Further, the control unit 914 includes, for example, an arithmetic unit such as a CPU (Central Processing Unit) (not shown), and a storage unit such as a RAM (Random Access Memory) and a ROM (Read Only Memory) in which programs and data for controlling the on-vehicle device 901 are stored. That is, the control unit 914 has functions as a computer and controls the on-vehicle device 901 based on the aforementioned program.

The resin case 915 is a case made of resin that houses therein the transmitter 911, the receiver 912, the input unit 913, and the control unit 914. The resin case 915 is fixed to and held by the vehicle (i.e., the automobile), for example, through a resin panel provided in the body of the vehicle.

Figure 2:
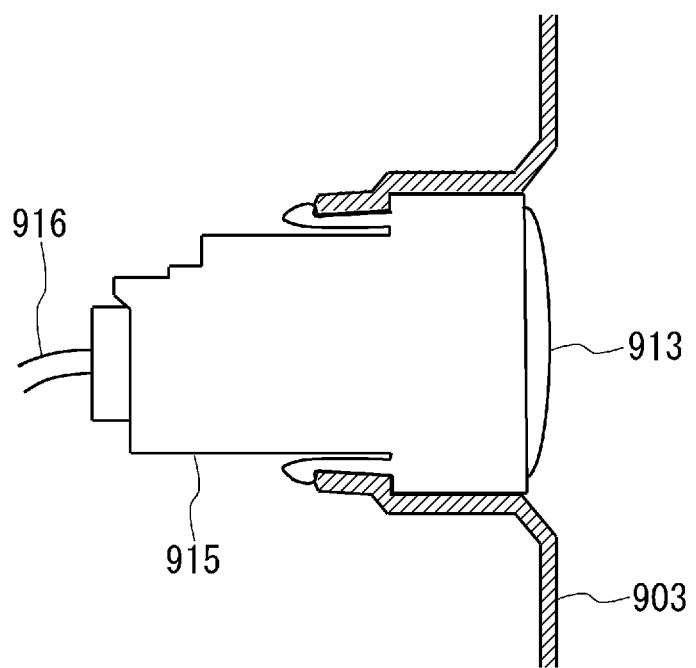
FIG. 2 is a schematic cross-sectional diagram showing a configuration of a resin case and a resin panel according to the related art.

FIG. 2 is a schematic cross-sectional diagram showing a resin case and a resin panel in the case where the input unit 913 is an engine start button.

A resin panel 903 is a resin panel provided in front of the driver's seat inside the vehicle, and a hole in which an on-vehicle device 1 is fitted (i.e., inserted) is formed.

The resin case 915 is fitted (i.e., inserted) into the hole of the resin panel 903, so that resin case 915 is fixed to and held by the body of the vehicle.

A cable 916 is a cable for connecting the control unit 914 of the on-vehicle device 901 to an ECU (Engine Control Unit) of the engine. The control unit 914 requests the ECU of the engine to start up the engine through the cable 916.

The electronic key 902 includes a receiver 921, a transmitter 922, and a control unit 923.

When the receiver 921 receives a search signal from the on-vehicle device 901, the receiver 921 notifies the control unit 923 of the reception of the search signal.

The transmitter 922 transmits a response signal, which is a radio signal, to the on-vehicle device 901 under the control of the control unit 923.

Upon receiving the information indicating the reception of the search signal from the receiver 921, the control unit 923 controls the transmitter 922 and thereby makes (e.g., instructs) the transmitter 922 transmit a response signal containing authentication information. Note that the control unit 923 determines the strength of the response signal based on the strength of the received search signal. Specifically, the control unit 923 controls the transmitter 922 in such a manner that the higher the strength of the search signal is, the stronger response signal the transmitter 922 transmits.

Further, the control unit 923 includes, for example, an arithmetic unit such as a CPU (Central Processing Unit) (not shown), and a storage unit such as a RAM (Random Access Memory) and a ROM (Read Only Memory) in which programs and data for controlling the electronic key 902 are stored. That is, the control unit 923 has functions as a computer and controls the electronic key 902 based on the aforementioned program.

As described above, when the strength of the response signal received from the electronic key 902 is equal to or smaller than a predetermined strength, when the strength of a noise signal contained in the response signal is equal to or larger than a predetermined strength, or when the strength of the response signal is equal to or smaller than the predetermined strength and the strength of the noise signal is equal to larger than the predetermined strength, the on-vehicle device 901 transmits a search signal having a higher strength. The higher the strength of the search signal is, the stronger response signal the electronic key 902 transmits. By the above-described configuration, the on-vehicle device 901 can receive a response signal having an appropriate strength.

However, in the key system 9001 for an automobile according to the related art, there are cases where as the strength of the search signal increases, the resin case 915 and the resin panel 903 are electrostatically charged. The electrostatic charging of the resin case 915 and the resin panel 903 causes noise signals in the response signal received by the on-vehicle device 901, and hence causes a further increase in the strength of the search signal and resulting larger electrostatic charging of the resin case 915 and the resin panel 903.

As a result of diligent study, the inventors have found that electrostatic charging of the resin case 915 and the resin panel 903 causes the processing speed of the control apparatus of the vehicle to decrease, so that the performance of the vehicle is impaired.

Overview of Embodiment

As a result of further study, the inventors have found that it is possible to prevent or reduce the deterioration of the performance of the vehicle by removing electrostatic charging of the resin case and the resin panel.

Therefore, in a first embodiment, at least one of the resin case and the resin panel, and the body of the vehicle electrically connected to a negative electrode of an auxiliary battery are connected to the ground, so that electrostatic charging is removed from either or both of the resin case and the resin panel.

Further, in a second embodiment, at least one of the resin case and the resin panel includes an electrostatic-charging removing surfactant layer on an exterior surface thereof, so that electrostatic charging is removed from at least one of the resin case and the resin panel by the electrostatic-charging removing surfactant layer.

First Embodiment

Figure 3:
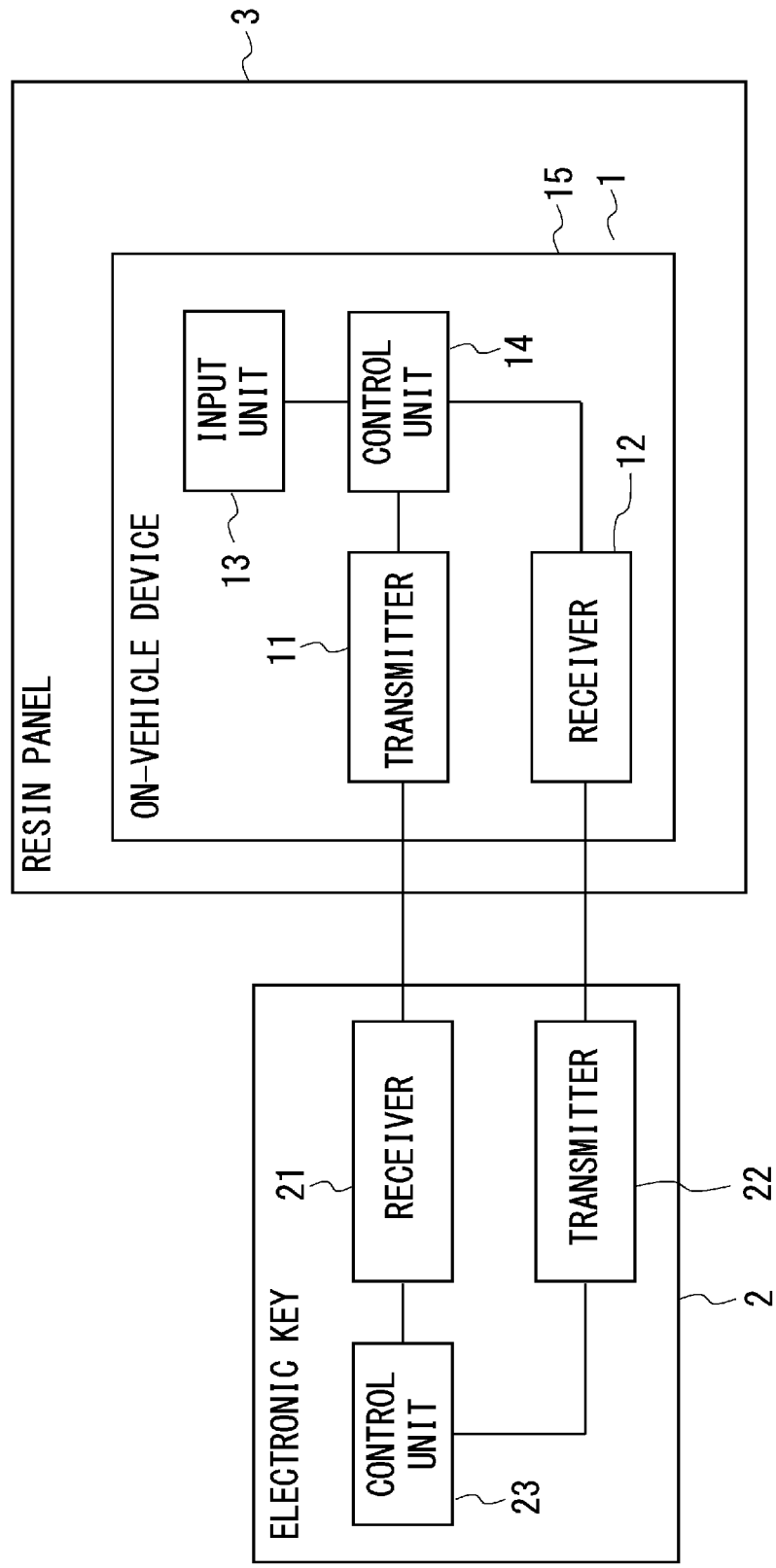
FIG. 3 is a block diagram showing a configuration of a smart key system according to a first embodiment.

FIG. 3 is a block diagram showing a configuration of a key system for an automobile according to a first embodiment.

A key system 1001 for an automobile according to the first embodiment enables a user carrying an electronic key to carry out predetermined operations and thereby to use various functions provided in the automobile.

Examples of combinations of predetermined operations and functions provided in automobiles include unlocking of a door of the automobile by depressing a button provided on the door and starting-up of an engine by depressing an engine start button.

The key system 1001 for the automobile according to the first embodiment includes an on-vehicle device 1, an electronic key 2, and a resin panel 3.

The on-vehicle device 1 includes a transmitter 11, a receiver 12, an input unit 13, a control unit 14, and a resin case 15.

The transmitter 11 transmits a search signal, which is a radio signal, to the electronic key 2 under the control of the control unit 14. The receiver 12 receives a response signal transmitted from the electronic key 2 in response to the search signal.

Upon receiving the response signal, the receiver 12 outputs authentication information contained in the response signal to the control unit 14.

The input unit 13 is, for example, a door unlock button or an engine start button, and is a device that receives a predetermined operation from a user. Upon receiving the predetermined operation from the user, the input unit 13 notifies the control unit 14 of the reception of the predetermined operation.

When the control unit 14 is notified, by the input unit 13, that the user has performed the predetermined operation, the control unit 14 controls the transmitter 11, and thereby makes (e.g., instructs) the transmitter 11 transmit a search signal.

Further, when the control unit 14 acquires, from the input unit 13, the authentication information contained in the response signal transmitted from the electronic key 2, the control unit 14 determines whether or not the acquired authentication information is the same as authentication information that is registered in advance. When the authentication information is the same as the one registered in advance, the control unit 14 notifies the control apparatus, which controls a predetermined function, that a function corresponding to the predetermined operation performed by the user should be carried out.

Note that when the strength of the response signal received from the electronic key 2 is equal to or smaller than a predetermined strength, when the strength of a noise signal contained in the response signal is equal to or larger than a predetermined strength, or when the strength of the response signal is equal to or smaller than the predetermined strength and the strength of the noise signal is equal to larger than the predetermined strength, the control unit 14 does not perform the determination and instead controls the transmitter 11 so that the transmitter 11 transmits a search signal having a strength higher than that of the previous search signal.

Further, the control unit 14 includes, for example, an arithmetic unit such as a CPU (Central Processing Unit) (not shown), and a storage unit such as a RAM (Random Access Memory) and a ROM (Read Only Memory) in which programs and data for controlling the on-vehicle device 1 are stored. That is, the control unit 14 has functions as a computer and controls the on-vehicle device 1 based on the aforementioned program.

The resin case 15 is a case made of resin that houses therein the transmitter 11, the receiver 12, the input unit 13, and the control unit 14. The resin case 15 is fixed to and held by the vehicle (i.e., the automobile) through the resin panel 3.

The resin case 15 is electrostatically charged as the strength of the search signal transmitted from the transmitter 11 increases.

The electronic key 2 includes a receiver 21, a transmitter 22, and a control unit 23.

When the receiver 21 receives a search signal from the on-vehicle device 1, the receiver 21 notifies the control unit 23 of the reception of the search signal.

The transmitter 22 transmits a response signal, which is a radio signal, to the on-vehicle device 1 under the control of the control unit 23.

Upon receiving the information indicating the reception of the search signal from the receiver 21, the control unit 23 controls the transmitter 22 and thereby makes (e.g., instructs) the transmitter 22 transmit a response signal containing authentication information. Note that the control unit 23 determines the strength of the response signal based on the strength of the received search signal. Specifically, the control unit 23 controls the transmitter 22 so that the higher the strength of the search signal is, the stronger response signal the transmitter 22 transmits.

Further, the control unit 23 includes, for example, an arithmetic unit such as a CPU (Central Processing Unit) (not shown), and a storage unit such as a RAM (Random Access Memory) and a ROM (Read Only Memory) in which programs and data for controlling the electronic key 2 are stored. That is, the control unit 23 has functions as a computer and controls the electronic key 2 based on the aforementioned program.

The resin panel 3 is a panel made of resin through which the on-vehicle device 1 is fixed to and held by the body of the vehicle. For example, when the input unit 13 is an engine start button, the resin panel 903 is a resin panel provided in front of the driver's seat inside the vehicle, and a hole in which the on-vehicle device 1 is fitted (i.e., inserted) is formed.

The resin panel 3 is electrostatically charged as the strength of the search signal transmitted from the transmitter 11 increases.

In the smart key system for an automobile according to the first embodiment, at least one of the resin case 15 and the resin panel 3, and the body of the automobile electrically connected to a negative electrode of an auxiliary battery are connected to the ground.

The auxiliary battery has a function of removing electrostatic charging from the body of the automobile, so that, by the above-described configuration, electrostatic charging is removed from either or both of the resin case 15 and the resin panel 3. As a result, it is possible to prevent or reduce the deterioration of the performance of the vehicle (i.e., the automobile) which would otherwise be caused by electrostatic charging of the resin case 15 and the resin panel 3.

In the smart key system for the automobile according to this embodiment, at least one of the resin case 15 and the resin panel 3, and the body of the automobile including an electrostatic-charging removing device may be connected to the ground. The electrostatic-charging removing device is preferably disposed, for example, in a metal frame such as a body frame, a brake pedal mounting frame, and a steering column frame. Further, at least one of the resin case 15 and the resin panel 3 is preferably connected directly to the ground, i.e., directly connected to the metal frame in which the electrostatic-charging removing device is disposed.

Examples of the electrostatic-charging removing device include air ionization self-discharging type aluminum foil adhesive tape or the like.

As described above, in the smart key system for the automobile according to the first embodiment, electrostatic charging is removed from either or both of the electrostatically-charged resin case 15 and the resin panel 3 through the connection between the body of the vehicle and the ground. By the above-described configuration, the key system for the automobile according to the first embodiment can prevent or reduce the deterioration of the performance of the vehicle (i.e., the automobile).

Second Embodiment

A smart key system for an automobile according to a second embodiment has a configuration similar to that of the key system for an automobile according to the first embodiment.

In the first embodiment, electrostatic charging is removed from at least one of the electrostatically-charged resin case 15 and the resin panel 3 through the connection between the body of the automobile and the ground. In contrast to this, in the second embodiment, electrostatic charging is removed from at least one of the electrostatically-charged resin case 15 and the resin panel 3 by an electrostatic-charging removing surfactant layer provided on the surface thereof.

At least one of the resin case 15 and the resin panel 3 according to this embodiment includes an electrostatic-charging removing surfactant layer on the exterior surface thereof.

The electrostatic-charging removing surfactant layer may be formed by, for example, spraying an electrostatic-charging removing surfactant on the exterior surfaces of the resin case 15 and/or the resin panel 3.

As the electrostatic-charging removing surfactant, a cationic surfactant, an anionic surfactant, an amphoteric ion-based surfactant, a non-ionic surfactant, or a mixture thereof may be used. Among them, the cationic surfactant is particularly preferred because of its high electrostatic-charging removing property.

The electrostatic-charging removing surfactant contains a hydrophilic group, so that it has a high affinity with water molecules. Therefore, the surface of the electrostatic-charging removing surfactant layer is strongly bound to water molecules. Since water molecules bonded to the electrostatic-charging removing surfactant remove static electricity, the electrostatic charging of the resin case 15 and the resin panel 3 are removed by the electrostatic-charging removing surfactant layer.

In the smart key system for an automobile according to this embodiment, at least one of the resin case and the resin panel may include an elastic film containing an electrostatic-charging removing surfactant on the exterior surface thereof. Note that in the case where the resin case and the resin panel include an elastic film containing an electrostatic-charging removing surfactant, they may or may not include an electrostatic-charging removing surfactant layer.

Further, in the smart key system for an automobile according to this embodiment, at least one of the resin case and the resin panel may include an elastic mesh sheet containing an electrostatic-charging removing surfactant on the exterior surface thereof. Note that in the case where the resin case and the resin panel include an elastic mesh sheet containing an electrostatic-charging removing surfactant, they may or may not include an electrostatic-charging removing surfactant layer.

Figure 4:
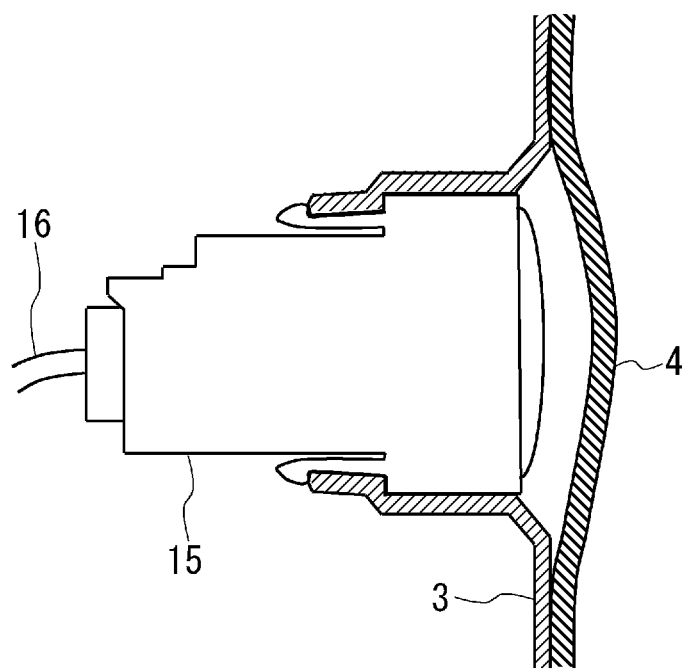
FIG. 4 is a schematic cross-sectional diagram showing an example of a resin case and a resin panel including an elastic mesh sheet containing an electrostatic-charging removing surfactant on an exterior surface.

FIG. 4 is a schematic cross-sectional diagram showing an example of a resin case and a resin panel including an elastic mesh sheet containing an electrostatic-charging removing surfactant on the exterior surface thereof, and is a schematic cross-sectional diagram in the case where the input unit 13 is an engine start button. It should be noted that an elastic mesh sheet 4 is an elastic mesh sheet containing an electrostatic-charging removing surfactant, and a cable 16 is a cable for connecting the control unit 14 of the on-vehicle device 1 to an ECU of an engine.

Figure 5:
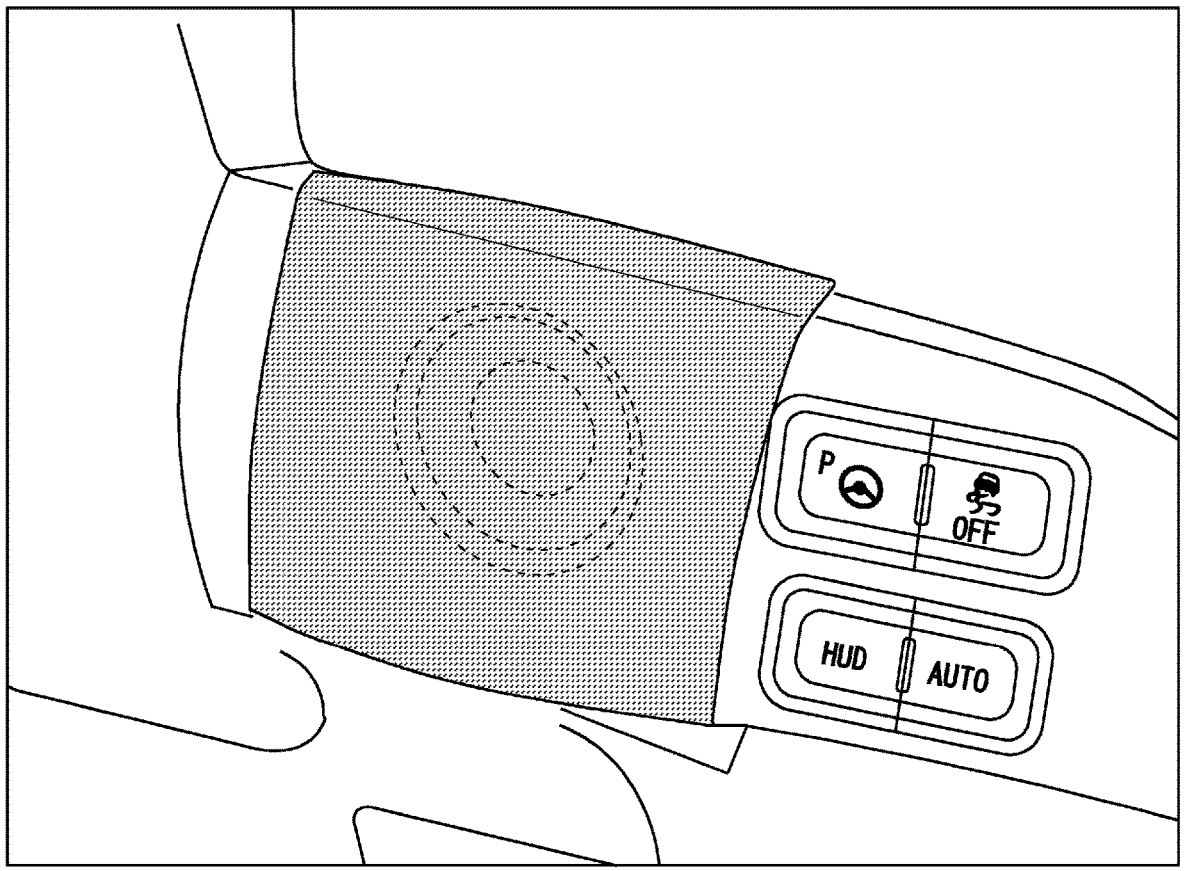
FIG. 5 is a photograph showing an example of a resin case and a resin panel including an elastic mesh sheet containing an electrostatic-charging removing surfactant on an exterior surface thereof.

Further, FIG. 5 is a figure showing an example of a resin case and a resin panel including an elastic mesh sheet containing an electrostatic-charging removing surfactant on the exterior surface thereof, and is a figure in the case where the input unit 13 is an engine start button.

Even by the above-described configuration, electrostatic charging of the resin case 15 and the resin panel 3 can be removed.

As described above, in the smart key system for an automobile according to the second embodiment, electrostatic charging is removed from at least one of the resin case 15 and the resin panel 3 by the electrostatic-charging removing surfactant layer provided on the exterior surface of at least one of the resin case 15 and the resin panel 3. By the above-described configuration, the smart key system for an automobile according to the second embodiment can prevent or reduce the deterioration of the performance of the vehicle (i.e., the automobile).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A smart key system for an automobile, comprising:
    an on-vehicle device configured to transmit and receive a radio signal to and from an electronic key; and
    a resin panel through which the on-vehicle device is fixed to and held by a body of the automobile,
    wherein the on-vehicle device comprises:
        a transmitter configured to transmit a search signal to the electronic key;
        a receiver configured to receive a response signal transmitted from the electronic key in response to the search signal;
        a control unit configured to control at least the transmission of the search signal;
        a resin case configured to house therein the transmitter, the receiver, and the control unit;
        an input unit on an end of the resin case that receives an input from a user and communicates with the control unit that the input was performed; and
        a surfactant that covers the input unit to remove an electrostatic charge generated by the search signal transmitted from the transmitter from either or both of the resin case and the resin panel.

2. The smart key system for the automobile according to claim 1, wherein the control unit increases a strength of the search signal when a strength of the response signal received by the receiver is equal to or smaller than a predetermined strength, when a strength of a noise signal contained in the response signal is equal to or larger than the predetermined strength, or when the strength of the response signal is equal to or smaller than a predetermined strength and the strength of the noise signal is equal to larger than the predetermined strength.

3. The smart key system for the automobile according to claim 1, wherein at least one of the resin case and the resin panel, and the body of the automobile electrically connected to a negative electrode of an auxiliary battery are connected to a ground to further remove the electrostatic charge.

4. The smart key system for the automobile according to claim 1, wherein at least one of the resin case and the resin panel, and the body of the automobile including an electrostatic-charging removing device are connected to a ground to further remove the electrostatic charge.

5. The smart key system for an automobile according to claim 1, wherein the surfactant includes a surfactant layer for the removal of the electrostatic charge on an exterior surface thereof.

6. The smart key system for the automobile according to claim 1, wherein the surfactant includes an elastic film over the input unit for the removal of the electrostatic charge on an exterior surface thereof.

7. The smart key system for the automobile according to claim 1, wherein the surfactant includes an elastic mesh sheet over the input unit for the removal of the electrostatic charge on an exterior surface thereof.

8. The smart key system for the automobile according to claim 1, wherein the input unit is an engine start button.

9. The smart key system for the automobile according to claim 1, wherein the input unit is an door unlock button.

* * * * *